United States Patent [19]

Foster

[11] Patent Number: 4,721,142
[45] Date of Patent: Jan. 26, 1988

[54] RIM & LOCK RING

[75] Inventor: William C. Foster, Creve Coeur, Ill.

[73] Assignee: Dresser Industries, Inc., Dallas, Tex.

[21] Appl. No.: 68,705

[22] Filed: Jun. 29, 1987

Related U.S. Application Data

[63] Continuation-in-part of Ser. No. 854,249, Apr. 21, 1986, abandoned.

[51] Int. Cl.⁴ .............................................. B60B 25/18
[52] U.S. Cl. ..................... 152/410; 29/159.1
[58] Field of Search ............... 152/409, 410, 396, 398, 152/397, 399, DIG. 10; 29/159.1, 159.01

[56] References Cited

U.S. PATENT DOCUMENTS

| | | | |
|---|---|---|---|
| 2,835,303 | 5/1958 | Woodward | 152/410 |
| 3,224,484 | 12/1965 | Smith | 152/410 |
| 3,599,698 | 8/1971 | Skehan et al. | 152/410 |
| 3,739,830 | 6/1973 | Verdier | 152/409 |
| 3,757,413 | 9/1973 | Craik | 29/159.1 X |
| 3,779,060 | 12/1973 | Schroder | 29/159.1 X |
| 3,846,886 | 11/1974 | Schroder | 29/159.1 |
| 4,143,533 | 3/1979 | Bosch | 29/159.01 X |
| 4,209,052 | 6/1980 | French | 152/410 |
| 4,438,797 | 3/1984 | Suckow | 152/410 |
| 4,530,387 | 7/1985 | Osawa . | |
| 4,552,194 | 11/1985 | Brown et al. | 152/410 |
| 4,554,961 | 11/1985 | Osawa et al. | 152/410 |

FOREIGN PATENT DOCUMENTS 0158102  9/1982  Japan ................................. 152/409

Primary Examiner—Robert B. Reeves
Assistant Examiner—Russell D. Stormer
Attorney, Agent, or Firm—Sigalos & Levine

[57] ABSTRACT

A rim construction for mounting a tire which has a base member in which a groove or gutter has been machined to a fine tolerance. A lock ring with a semicircular projection is formed by cold extruding steel to a matching fine tolerance of the gutter so that when the lock ring semicircular portion or projection is place in the gutter, uniform maximum engagement occurs between the gutter surface and the semicircular lock ring projection surface.

11 Claims, 4 Drawing Figures

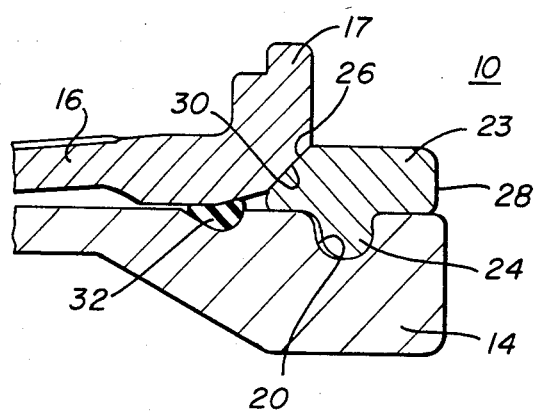
FIG. 1
PRIOR ART
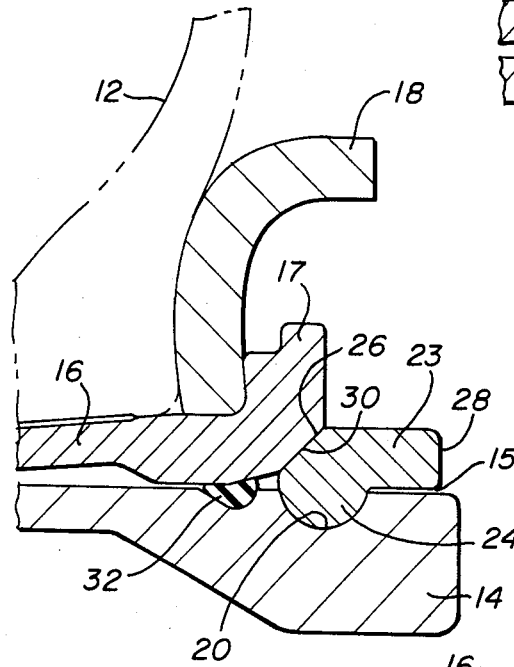
FIG. 2
PRIOR ART
FIG. 3
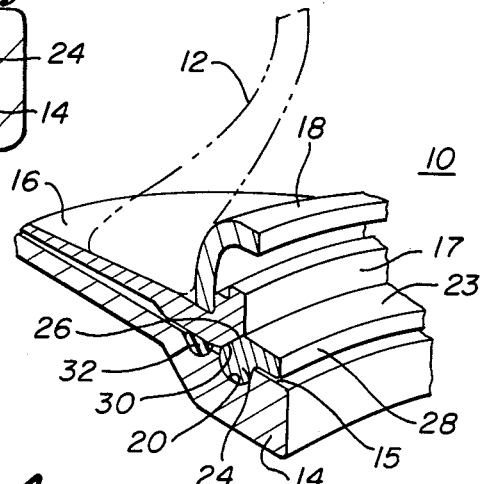
FIG. 4

RIM & LOCK RING

BACKGROUND OF THE INVENTION

This application is a continuation-in-part application of copending application Ser. No. 854,249 filed Apr. 21, 1986, now abandoned, and entitled IMPROVED RIM AND LOCK RING.

The present invention relates to a rim construction for mounting a tire and more particularly to rim construction for mounting tires of the type generally utilized on trucks and off-highway vehicles.

The usual rim structure for mounting large tires on equipment such as earth movers or off-road equipment includes an endless separate bead seat ring that telescopes over a rim base with one of the tire beads wedged thereon. A rim flange is retained between the tire casing and an outwardly extending flange on the bead seat ring and a projection on a lock ring, usually a split type, is inserted in a groove or gutter formed in the rim base and has a flat surface which engages a corresponding flat surface on the bead seat ring to lock these members in place on the rim base. The lock rings, such as that described in U.S. Pat. No. 3,224,484, are coiled which puts high internal stresses in the lock ring that tend to cause it to twist so that the flat surface on it does not uniformly engage the corresponding flat surface on the bead seat. Thus stresses are created in the lock ring and the members in engagement therewith which often result in failure. To overcome the twisting forces on the lock ring and try to offset them, devices are used such as a lug attached to the lock ring which extends radially in both directions beyond the ring to engage a portion of the bead seat ring and the base member to prevent the ring from twisting.

In addition, in the prior art, the rim section, including the flange, rim base and gutter, bead seat ring and lock ring are formed of hot rolled steel which, without subsequent machining, prevents a close tolerance design fit of the locking projection with the base member groove when they are assembled thus creating an unequal distribution of stress which results in failure of the metal.

The present invention overcomes the disadvantages of the prior art by providing a rim construction in which the groove or gutter in a base member is machined to a fine predetermined tolerance and the lock ring is formed by cold forming steel, without subsequent machining, in order to obtain a matching fine predetermined tolerance design fit with the gutter so that maximum contact area is formed between the gutter and the lock ring to distribute stress. Secondly, a lip extends horizontally from the lock ring and is integrally formed with the lock ring to prevent twisting of the ring. Thus stresses are evenly distributed because the lock ring projection surface has a design fit which more uniformly engages the groove or gutter surface to evenly distribute stresses therein.

SUMMARY OF THE INVENTION

Thus the present invention relates to a rim construction for mounting a tire comprising a base member having an annular groove of semicircular cross-section, said groove being machined to a predetermined tolerance, an annular bead seat positionable over the base member and having a radially and outwardly extending flanged portion and a chamfered outer edge forming a flat surface in cross-section, an annular lock ring having a projection of semicircular cross-section for mating with and positionable in said groove and having a surface engagable with said bead seat ring chamfered outer edge surface, said lock ring being constructed by cold forming steel to the tolerance of said groove, and a lip integrally formed with and extending outwardly from said annular lock ring to prevent twisting of said lock ring.

The invention also relates to a method of forming a rim construction for mounting a tire comprising the steps of forming a base member, machining an annular groove of semicircular cross-section in said base member to a predetermined tolerance, forming an annular bead seat ring with a radially extending and outwardly flanged portion and a chamfered outer edge surface, positioning said annular bead seat ring over said base member, forming an annular lock ring having a projection of semicircular cross-section by cold forming of steel, positioning said lock ring projection in said machind groove with a surface matching and abutting said chamfered outer edge surface of said annular bead seat ring, and integrally forming a lip extending outwardly from said annular lock ring to prevent twisting of said lock ring.

BRIEF DESCRIPTION OF THE DRAWINGS

These and other objects of the present invention will be disclosed more fully in conjunction with the following description and the appended drawings in which like numerals represent like components and in which:

FIG. 1 is a cross-sectional view of a prior art rim and lock ring device;

FIG. 2 is a cross-section of a second type prior art rim and lock ring device;

FIG. 3 is a cross-sectional view of a portion of a wheel illustrating the features of the present invention; and FIG. 4 is a perspective view, partly in section and with portions broken away, of the wheel construction shown in FIG. 3.

DETAILED DESCRIPTION OF THE DRAWINGS

Referring now in detail to the drawings, there is shown in FIG. 1, a cross-section of a prior art rim and lock ring assembly comprising a base member 14 having a bead seat ring 16 positioned over base member 14 with an O-ring 32 provided to seal the clearance between the base member 14 and the bead seat ring 16. Each of the components of the wheel, including the base member 14, the bead seat ring 16, and the lock ring 23 are formed from hot rolled sections. A gutter or groove 20 is formed in base member 14 in which a projection 24 of lock ring 23 is located. The gutter section 20 is not semicircular in cross-section and there is a poor surface match of the projection 24 from lock ring 23 with the surface of gutter 20. The degree to which the projection 24 of lock ring 23 contacts the surface of gutter or groove 20 is designated as the "fit" of the two surfaces and is defined as:

$$\text{Fit} = \frac{\text{contact surface area of the lock ring projection}}{\text{surface area of the groove}}$$

The fit of the prior art rim and lock ring is designed to be 20–25%. In other words, the 20–25% of the surface area of projection 24 is intended to have contact with the surface of groove 20. However, because all of the components are formed from hot rolled steel and have poor tolerances the actual fit is in the range of 5-25%. In addition, an extension 28 is formed on lock ring 23 which rests on a shoulder of base member 14 to assist in preventing twisting of the lock ring.

Because the protruding portion 24 of lock ring 23 does not match with close tolerance in groove or gutter 20, due to the fact that the components are formed from hot rolled steel, the abutting surfaces 26 on lock ring 23 and 30 on bead seat ring 16 do not match perfectly around the entire circumference of the wheel and thus stresses are introduced in the various components of the rim sometimes creating failure of the parts.

FIG. 2 is a partial cross-sectional view of another prior art device which has essentially the same deficiencies as are found in the device of FIG. 1. Again, in FIG. 2, groove 20 and the extension 24 on lock ring 23 are not perfectly matched. Again, because of the fact that the parts are formed from hot rolled steel, there is not a close tolerance match between gutter 20 and the mating extension 24 of lock ring 23. The design fit in this case is 70-75%, but the actual fit is 50-75% die to the components being formed of hot rolled steel. Again, this allows stress points to occur in the various components and prevents the matching surfaces 26 and 30 from being in close contact around the entire circumference of the wheel rim thereby creating the stresses in the various parts which can cause failure thereof.

Referring now to the present invention in FIG. 3 of the drawings, there is shown a wheel, indicated generally at 10 consisting essentially of a tire 12 mounted on a bead seat ring 16 which is positioned over base member 14 with an O-ring 32 provided to seal the clearance between base member 14 and the bead seat ring 16. The rim flange 18 engages an outwardly flanged portion 17 on the bead seat ring 16. A gutter or groove 20 is formed, substantially semicircular in cross-section, in base member 14 in which a split lock ring 23 is mounted to engage a flat surface 30 on the endless bead seat ring 16. The gutter or groove 20 is formed by machining the base member 14 to a radius of approximately 0.625 inch and having a predetermined tolerance as for instance in the range of +0 and −0.005 inches.

The present invention invisions constructing the lock ring 23 with a process that will enable the lock ring to have a matching fine, or close tolerance with groove 20 without subsequent machining of the lock ring. Thus, lock ring 23 may be constructed by cold forming steel in order to obtain a matching close tolerance with machined gutter or groove 20, "Cold forming" of steel, as that term is used herein is defined by the American Society for Metals as including cold drawings which is defined as reducing the cross-section of a wire or rod by pulling it through a die at room temperature, cold rolling which is defined as reducing the cross-sectional area of metal stock, or otherwise shaping metal products, through the use of rotating rolls at room temperature, or cold extrusion (impact extrusion) which is defined as producing a desired cross-sectional outline by forcing an unheated slug through an extrusion die and, as used herein, also means any other process which enables a lock ring to be constructed without machining to obtain a matching fine tolerance with a machined gutter or groove 20. That portion 24 of lock ring 23 which mates with groove 20 is also semicircular in cross-section. The design fit in this case is 95-99% and the actual fit is 95-99%. A substantially flat surface 26, in cross-section, is formed on lock ring 23 and matches with a corresponding flat surface 30, in cross-section, on bead seat ring 16. Thus the two surfaces 26 and 30 are in engagement with each other around the entire wheel when the rim is assembled because of the actual fit of groove 20 with lock ring projection 24.

In order to prevent lock ring projection 24 from twisting in groove 20, a lip or tab 28 is integrally formed therewith and extends horizontally outwardly approximately 1.25 inches away from split lock ring 23 in one embodiment. A gap 15 of approximately 0.03 inch exists between lip 28 and base member 14 because of the predetermined radius of projection 24 as it mates with groove 20.

Thus it can be seen in FIG. 3 that since the groove or gutter 20 is machined to a fine tolerance and because the lock ring 23 is constructed by cold forming steel, a matching fine tolerance can be obtained to match that of gutter 20 so that an actual fit of 95-99% is obtained. Further, because of lip 28 integrally formed on the lock ring 23, lock ring 23 is prevented from twisting. Thus stresses are minimized because surfaces 26 and 30 are in uniform engagement with each other and in addition, gutter 20 and the outer surface of the semicircular portion 24 of lock ring 23 are also in uniform engagement.

FIG. 4 is a perspective partially in section and illustrating how the lip for tab 28 is integrally formed with lock ring 24.

The prior art construction shown in FIG. 1 and FIG. 2 could be substantially improved by machining the groove 20 in the shape as shown and forming the lock ring 23 with projection 24 by cold forming steel. When such is done, the actual fit in FIG. 1 becomes the design fit of 20-25% and the actual fit of the design in FIG. 2 becomes the design fit of 70-75%. The preferred shape of groove 20 and mating projection 24 is semicircular in cross-section because such shape increases the actual fit to 95-99%.

Thus there has been disclosed a rim construction for mounting a tire which has a base member in which a groove or gutter has been machined to a fine tolerance. A lock ring with a semicircular projection is constructed by cold forming steel to a matching fine tolerance of the gutter so that when the lock ring semicircular portion or projection is placed in the gutter, uniform maximum engagement occurs between the gutter surface and the semi-circular lock ring projection surface. In addition, a lip is formed on the lock ring which horizontally extends outwardly away from the bead seat ring to prevent the lock ring from twisting. Because the lock ring is prevented from twisting and because the groove is uniformly in engagement with the semicircular portion of the lock ring, the flat surface on the lock ring, in cross-section, which matches with the flat surface on the bead ring, in cross-section, also has uniform engagement and thus the stress on the various components including the lock ring, the base member, and the bead seat ring, are minimized. All of the components of the present rim and lock ring construction can be made of cold formed steel. The lock ring must be constructed of cold formed steel.

It is understood that suitable modifications may be made in the structure as disclosed provided such modifications come within the spirit and scope of the appended claims. Having now, therefore, fully illustrated and described my invention, what I claim to be new and desire to protect by letters PATENT is:

I claim:

1. A method of forming a rim construction for mounting a tire comprising the steps of:
   a. forming a base member,
   b. machining an annular groove in said base member to a predetermined fine tolerance and cross-section,
   c. forming an annular bead seat ring with a radially and outwardly extending flanged portion having a chamfered outer edge surface,
   d. positioning said annular bead seat ring over said base member,
   e. cold extruding an annular lock ring with a projection having a cross-section fine tolerance corresponding to said groove cross-section fine tolerance,
   f. integrally forming a lip extending outwardly from said annular lock ring to prevent twisting of said lock ring, and
   g. positioning said lock ring projection in uniform engagement with said machined groove with a surface on said lock ring matching and abutting said chamfered outer edge surface of said annular bead seat ring.

2. The method of claim 1 further including the steps of:
   a. machining said groove to said predetermined fine tolerance in semi-circular shape in cross-section, and
   b. cold extruding a semi-circular steel projection of matching fine tolerance on said lock ring of steel for uniform engagement with said groove.

3. The method of claim 2 further including the step of forming said semicircular projection on said bead seat ring of such a radius as to create a space between said lip and said base member when said projection is positioned in said gutter.

4. The method of claim 2 wherein said matching fine tolerance is in the range of +0 and −0.005 inches.

5. A method of forming a rim construction for mounting a tire comprising the steps of:
   a. forming a base member,
   b. matching an annular groove in said base member to a predetermined fine tolerance and cross-section,
   c. forming an annular bead seat ring with a radially and outwardly extending flanged portion having a chamfered outer edge surface,
   d. positioning said annular bead seat ring over said base member,
   e. cold forming an annular lock ring with a projection having a cross-section fine tolerance corresponding to said groove cross-section fine tolerance,
   f. integrally forming a lip extending outwardly from said annular lock ring to prevent twisting of said lock ring, and
   g. positioning said lock ring projection in uniform engagement with said machined groove with a surface on said lock ring matching and abutting said chamfered outer edge surface of said annular bead seat ring.

6. The method of claim 5 further including the steps of:
   a. matching said groove to said predetermined fine tolerance in semicircular shape in cross-section, and
   b. cold forming a semicircular steel projection of matching fine tolerance on said lock ring for uniform engagement with said groove.

7. The method of claim 6 wherein said matching fine tolerance is in the range of +0 and −0.005 inches.

8. The method of claim 6 further including the step of forming said semicircular projection on said bead seat ring of such a radius as to create a space between said lip and said base member when said projection is positioned in said gutter.

9. The method of claim 5 wherein the step of cold forming said annular lock ring further comprises the step of cold drawing said annular lock ring.

10. The method of claim 5 wherein the step of cold forming said annular lock ring further comprises the step of cold rolling said annular lock ring.

11. The method of claim 5 wherein the step of cold forming said annular lock ring further comprises the step of cold extruding said annular lock ring.

* * * * *

UNITED STATES PATENT AND TRADEMARK OFFICE
CERTIFICATE OF CORRECTION

PATENT NO. : 4,721,142

DATED : January 26, 1988

INVENTOR(S) : William C. Foster

It is certified that error appears in the above-identified patent and that said Letters Patent is hereby corrected as shown below:

Column 6, line 21, (Claim 6), "matching" should read -- machining --.

Signed and Sealed this

Thirtieth Day of August, 1988

*Attest:*

DONALD J. QUIGG

*Attesting Officer*   *Commissioner of Patents and Trademarks*